Patented Dec. 24, 1929

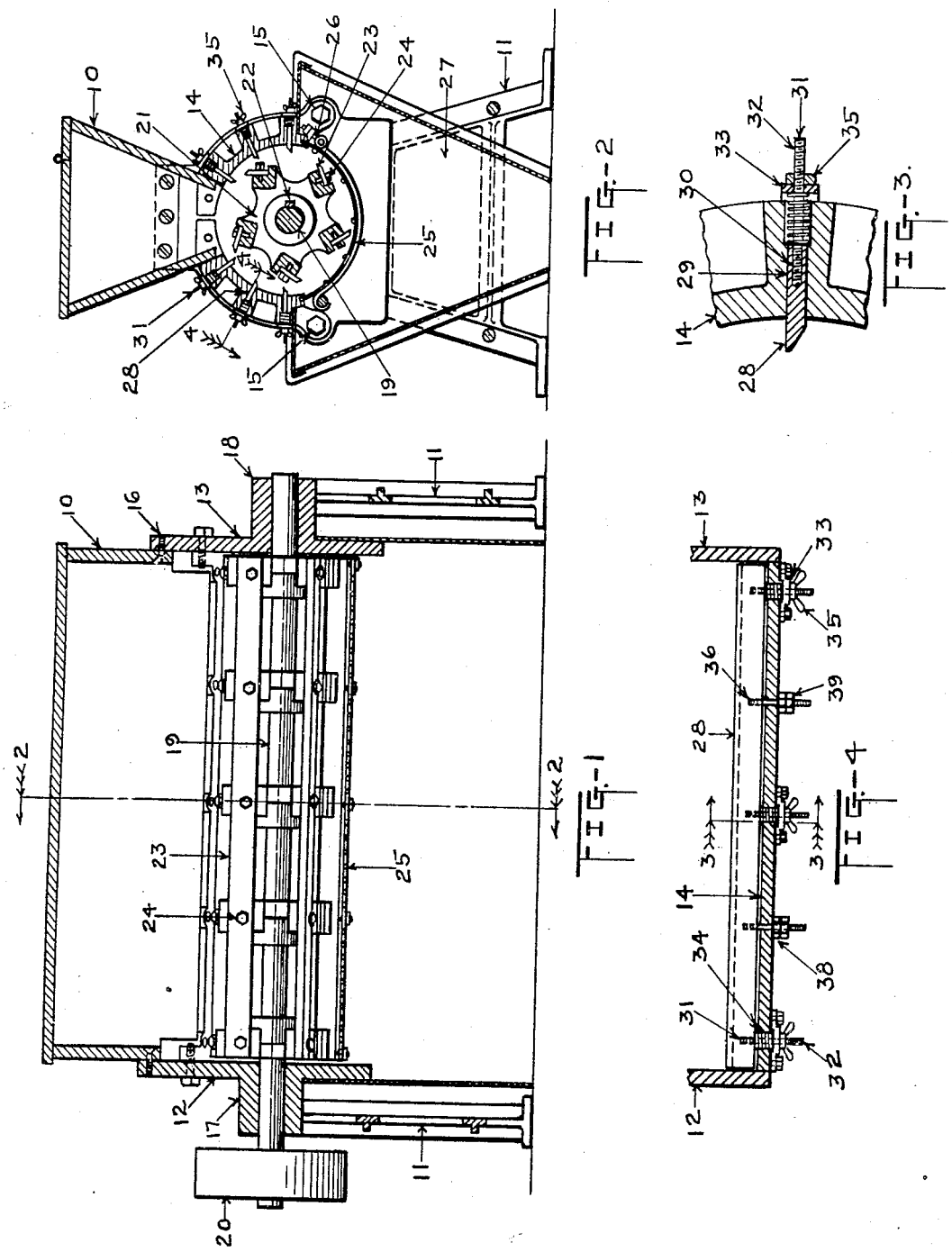

1,740,787

UNITED STATES PATENT OFFICE

DELMOND SENSENBAUGH, OF BLOOMINGTON, ILLINOIS

GRAIN-CRACKING MACHINE

Application filed August 5, 1927. Serial No. 210,866.

This invention relates to grain cracking and reducing machines, and more particularly to machines adapted to be used in cracking grain for poultry feeds.

One of the objects of the invention is in the provision of a corn cracking machine, conventional, generally, in construction, with the exception that there is provided a stationary knife adjustment which provides means for manually controlling the operation of the machine as respects the adjustment of the knives during the operation thereof, thereby increasing greatly the efficiency of the machine.

Another object of the invention lies in the provision of a simplified adjustment mechanism for the stationary knives of a corn cracking machine, which permits the operator to manually adjust the stationary knives during the operation of the machine, with the result that he can test the corn during such adjustment.

Still another object lies in the provision of a corn cracking machine having specially manually controlled adjustment mechanism for the stationary knives permitting adjustment of said knives during the operation of the machine, with the result that variations in the condition of the corn may be quickly and efficiently compensated for by an exterior manual adjustment during operation of the machine.

Yet another object lies in the provision of a manually controlled adjustment mechanism for the stationary knives of a conventional corn cracking machine, said adjustment mechanism including a spring tensioned mounting and locking mechanism therefor.

Other objects will appear in the following specification, taken in connection with the annexed drawings, in which Fig. 1 is a front elevation, partially in section, of a conventional corn cracking machine;

Fig. 2 is a cross-sectional view in end elevation, showing the manner of mounting the stationary knives to permit a spring tensioned mounting and exterior adjustment thereof during operation of the machine;

Fig. 3 is an enlarged detail showing the manner of supporting and adjusting the stationary knives to permit exterior adjustment during operation of the machine; and Fig. 4 is an enlarged detail showing the spring tensioned and adjusting mechanism for the stationary cutting knives.

Before referring specifically to the drawings, in which applicant has disclosed his exteriorly mounted spring tensioned adjusting means for the stationary knives of a corn cracking machine, it might be stated that applicant has, for many years, been the engineer of a mill in which corn has been cracked for poultry feeds. He has utilized, and is now utilizing, a number of corn cracking machines which are generally similar in design. As a matter of fact, it was upon these conventional machines that applicant made his improvement, which not only increases the efficiency of the machine, but also increases the capacity thereof, as well as decreasing the corn feed meal, which is an undesirable by-product of the corn cracking operation. It was one of applicant's duties to superintend the operations of the mechanical units of the mill and in his engineering capacity it was necessary that he make the adjustments of the stationary knives in the corn cracking machines. In order to accomplish this operation, applicant always found it necessary to shut down the machine, open up the side plates and make the necessary adjustments, including continually measuring the distances of the rotating and stationary blades as would insure proper adjustment. This necessarily lengthy and detailed adjustment of the stationary knives not only decreased the efficiency of the machine, by shutting same down, but even after adjustment and the machine started, it was oftentimes found necessary to improve upon such adjustment, which meant again stopping the machine and opening same up for further mechanical operations necessary in such adjustment. This was not the kind of adjustment that applicant desired, in view of the fact that he could not make the adjustment gradual and test the nature of the cracked corn during the adjustment period. Also, applicant found that the condition of the grain forced him to make adjustment of the stationary knives, if the highest efficiency of the machine was to be had.

In other words, the changing condition of the grain meant changing of the adjustment of the stationary knives, which took time.

Applicant experimented for a considerable time before he devised mechanism permitting an exterior manual adjustment of the stationary knives during operation of the machine, and permitting him to gradually vary the position of the stationary knives and at the same time reach down beneath the sieve and test the condition of the corn. This adjustment means which applicant finally devised was immediately put into practice in the mill in which he was engineer and resulted in an increased efficiency of the otherwise satisfactory machines by permitting him to adjust the machines during operation, as well as to vary the adjustment in exact relation to the changing condition of the corn. It is apparent, also, that if, possibly, a minimum of adjustment might be necessary to take care of the changing condition of the corn in order to increase the efficiency and the engineer would be required, in order to make such adjustment, to shut down the machine and take considerable time in the adjustment of the knives, as was done previously, he would very likely fail to do so.

Referring to the drawings, there is shown generally the conventional corn cracking machine, which includes the corn hopper 10, a supporting frame 11, head portions 12 and 13, said head portions being carried by the supporting members 11. Two concave side plates 14 are secured at their ends to the head pieces 12 and 13. These concave side plates may or may not have a conventional pivotal mounting, as shown at 15. The hopper 10 is also secured to the head pieces in the manner shown at 16. The head pieces also form the bearing surfaces 17 and 18 for the rotating shaft 19, which has a conventional pulley 20 secured to a projecting end thereof, the pulley being adapted to be driven by any power means, either electric motor, gasoline engine, or otherwise. Carried upon a framing portion 21 which is keyed to the shaft 19 at 22, are a plurality of rotating cutting knives 23. These cutting knives are disposed parallel to the shaft 19, as may be clearly seen in Fig. 1, said knife portions being bolted as at 24, to the before mentioned framing.

Disposed beneath the rotating knife structure, as well as the side plates 14, is a sieve 25, which although not shown in the present instance, may be capable of adjustment to accommodate various sizes of corn particles that pass therethrough. This sieve 25 has an adjustable means for securing same, as shown at 26.

A cracked-corn bin is described generally as 27, surrounding the lower part of the machine and adapted to receive the grain that is cracked by the knife portions.

Now, with respect to the stationary knives, which obviously co-operate with the rotating knives in the corn-cracking operation, we find a plurality of horizontally disposed stationary knife portions 28, placed in knife retaining portions, or as a matter of fact, horizontally disposed slots 29 formed in the side plates 14. These side plates are cast, as may be seen perhaps most clearly in Figs. 2 and 4, in a manner to support the knives in a secure manner therein. These knives have their edges disposed with respect to the rotating knives so as to crack the corn upon its passage therethrough, induced by the rotation of the knives. Obviously, when the corn has been cracked to certain fineness, it will pass through the screen 25 and into the bin 27.

The stationary knives 28, in the present instance, have imbedded therein, as at 30, a series of outwardly projecting bolt members 31 threaded upon their outer ends as at 32. These bolts, as stated before, are fixed secured to the knives and their outer and threaded ends pass through steel blocks 33 bolted to the side plates 14. As may be clearly seen in Fig. 4, the knife portions do not entirely fill the slotted portions 29, but this extra space is filled up by powerful coil springs 34, which surround the bolts 31, and abutting at one side the outer face of the knives 28 and upon their opposite side to blocks 33 bolted to the side plates 14.

Threaded upon the outer ends of the bolts 31 are manual controlling nuts 35 enlarged to permit manual grasp thereof.

Other means is provided of an exterior adjustment nature for holding the blades 28 against lateral movement. This means comprises two bolt members 36 for each stationary blade 28, their inner ends being embedded in blades 28 and their outer ends, after passing through holes in the side walls 14, being threaded and secured by nuts 38 having lock nuts 39 disposed thereon.

Referring generally to the operation of the machine, it is thought that same is obvious and that shelled corn thrown into the hopper is adapted to be picked up by the rotating knives and cracked during the passage of the rotating knives past the stationary knives. The corn, when cracked to the desired fineness, passes through the sieve into the bin 27.

Such corn as has not been cracked to permit passage through the sieve, is again rotated for further cutting or cracking operation.

It is apparent that one may vary the cracking operation, as respects the size of the corn kernels which make up the feed, by movement of the stationary knives towards or from the rotating knives. In the present instance, all that applicant has to do is to loosen up the nuts 38 and 39, and thereafter manually grasp the portions 35, moving same in a clockwise manner to withdraw the knives and in a counter-clockwise manner to project the knives inwardly. Obviously, withdrawal of the knives results in a larger size of feed and an inward projection of the knives in a smaller size feed. Similarly, it is often found desirable to vary the position of the knives to take care of the condition of the corn, and this is done in exactly the same manner. During operation of the machine, the operator may accomplish this adjustment of the knives, and at the same time reach his hand beneath the sieve and test the cracked corn that is coming through. He may, therefore, make his adjustment somewhat in the nature of a trial and error manner, but it is apparent that a much closer adjustment may be made than could possibly be made by stopping the machine and measuring the distance of the knives one from the other and thereafter tightening same up.

Following the manual adjustment of the stationary knives during operation of the machine, the operator must still tighten the nuts 38 and 39, which are in the nature of safety members to prevent movement of the stationary knives into the path of the rotating knives.

What I claim is:

1. In a machine for cracking grain, a rotary shaft, and attached cutters, a casing enclosing said shaft and cutters, comprising head portions and two side plates, a screen disposed below the rotary cutters, a hopper attached to the side plates in a manner to direct the grain therebetween, a plurality of stationary knives carried by the side plates, and disposed parallel with respect to the rotating shaft, mechanism permitting exterior manual adjustment of the stationary knives during movement of the rotary shaft and attached cutters, including supporting guideways for the stationary knives formed interiorly of the side plates, a series of bolt members embedded in the stationary knives and having their threaded ends projecting outwardly through apertures in the side plates, a series of coil springs surrounding the bolts, said springs being located in the supporting guideways in a manner to apply tension upon the stationary knives, and manually operated nut portions threaded upon the projecting ends of the bolts in such manner as to control the inward and outward movement of the stationary knives.

2. In a machine for cracking grain, a rotary shaft and attached cutters, a casing enclosing said shaft and cutters comprising head portions and two side plates, a screen disposed below the rotary cutters, a hopper attached to the side plates in a manner to direct the grain therebetween, a series of stationary knives carried by the side plates and extending parallel with respect to the rotary shaft, guideways formed interiorly of the side plates for supporting the stationary knives, a series of bolt members having their inner ends secured to the stationary knives and having their outer threaded ends projecting through apertures in the side plates, a series of nuts threaded upon the projecting ends of the bolt members and coil springs surrounding the bolt members and applying tension to the stationary knives in a manner to force same towards the rotating cutters, and a second series of bolt members and securing means co-operating with the stationary knives in a manner to further hold said knives in a fixed position.

3. In a machine for cracking grain, a rotary shaft and attached cutters, a casing enclosing said shaft and cutters, comprising head portions and two side plates, a screen disposed below the rotary cutters, a hopper attached to the side plates in a manner to direct the grain therebetween, a series of stationary knives carried in supporting guideways formed interiorly of the side plates, and spring tensioned adjustment mechanism including exterior, manually controlled members permitting inward and outward movement of the stationary knives during movement of the rotary knives, to the end of increasing the efficiency of the machine and permitting examination of the cracked grain simultaneously with the adjustment of the stationary knives.

4. In a machine for cracking grain, a rotary shaft and attached cutters, comprising head portions and two sides plates, a screen disposed below the rotary cutters, a hopper attached to the side plates in a manner to direct the grain therebetween, a plurality of stationary knives carried by the side plates, and disposed parallel with respect to the rotating shaft, means for permitting exterior manual adjustment of the stationary knives during movement of the rotary shaft and attached cutters, including supporting guideways for the stationary knives formed interiorly of the side plates, bolt members fixedly secured to the stationary knives and having their threaded ends project outwardly through apertures in the side plates, coil springs surrounding the bolts, said springs being located in the supporting guideway in a manner to apply tension upon the stationary knives, manually operated nut portions threaded upon the projecting ends of the bolts in such manner as to control the inward and outward movement of the stationary knives, and bolts fixedly secured to said stationary knives, said bolts projecting through apertures in the sides and having nuts screwed onto their threaded outer ends, said nuts engaging the outside of said side to prevent further outward movement of the stationary knives after adjustment of the same has been made.

In testimony whereof I have hereunto affixed my signature.

DELMOND SENSENBAUGH.